US008893371B2

(12) United States Patent
Barlier et al.

(10) Patent No.: US 8,893,371 B2
(45) Date of Patent: Nov. 25, 2014

(54) METHOD OF PRODUCING A PART BY DECOMPOSITION INTO LAYERS, SAID PART HAVING FLUID TRANSFER CHANNELS EXTENDING THROUGH THE INTER-LAYERS THEREOF

(75) Inventors: Claude Barlier, Coinches (FR); Denis Cunin, Les Poulieres (FR); Cyril Pelaingre, Mandray (FR)

(73) Assignee: Cirtes SRC (Societe Anonyme), Saint die des Vosges (FR)

( * ) Notice: Subject to any disclaimer, the term of this patent is extended or adjusted under 35 U.S.C. 154(b) by 1486 days.

(21) Appl. No.: 11/915,728

(22) PCT Filed: Mar. 27, 2006

(86) PCT No.: PCT/FR2006/000661
§ 371 (c)(1),
(2), (4) Date: Nov. 27, 2007

(87) PCT Pub. No.: WO2006/128983
PCT Pub. Date: Dec. 7, 2006

(65) Prior Publication Data
US 2008/0196232 A1 Aug. 21, 2008

(30) Foreign Application Priority Data
Jun. 3, 2005 (FR) ...................................... 05 05657

(51) Int. Cl.
*B21D 39/00* (2006.01)
*B23P 11/00* (2006.01)
*G05B 19/4099* (2006.01)

(52) U.S. Cl.
CPC .. *G05B 19/4099* (2013.01); *G05B 2219/49019* (2013.01)

USPC ................. 29/512; 29/738; 700/119; 249/81; 264/219

(58) Field of Classification Search
USPC ................. 29/512, 738, 407.01, 407.05, 428; 700/119; 249/79, 81; 264/219
See application file for complete search history.

(56) References Cited

U.S. PATENT DOCUMENTS

| 5,031,483 A | * | 7/1991 | Weaver ........................ 76/107.1 |
| 5,819,388 A | * | 10/1998 | Salm .............................. 29/424 |
| 5,872,714 A | * | 2/1999 | Shaikh et al. ................... 700/98 |
| 6,021,358 A | * | 2/2000 | Sachs ............................. 700/98 |
| 6,112,804 A | * | 9/2000 | Sachs et al. ................... 164/348 |
| 6,354,361 B1 | * | 3/2002 | Sachs et al. ................... 164/128 |

(Continued)

FOREIGN PATENT DOCUMENTS

| FR | 2845492 | 4/2004 |
| WO | WO 0102160 | 1/2001 |
| WO | WO 2004/079463 | 9/2004 |

*Primary Examiner* — David Bryant
*Assistant Examiner* — Christopher M Koehler
(74) *Attorney, Agent, or Firm* — Egbert Law Offices, PLLC

(57) ABSTRACT

The invention relates to a process for the manufacture of a part penetrated by fluid channels or ducts for the manufacture of a mold that includes channels or ducts for the circulation and/or transfer of a fluid from the molding portion to the non-molding portion and vice versa. The part is formed and manufactured by a Stratoconception (TM) method based on the principle of decomposing the part, via a set of inter-stratum planes, into a succession of strata. After assembly, the part is formed, and channels are provided in the various inter-stratum planes for allowing a fluid to pass through the part. The invention also relates to the parts obtained by the process.

7 Claims, 2 Drawing Sheets

(56) References Cited

U.S. PATENT DOCUMENTS

| | | | |
|---|---|---|---|
| 6,627,835 B1* | 9/2003 | Chung et al. | 219/69.12 |
| 7,195,223 B2* | 3/2007 | Manuel et al. | 264/219 |
| 7,340,317 B2* | 3/2008 | Manuel et al. | 700/98 |
| 7,920,937 B2* | 4/2011 | Barlier et al. | 700/119 |
| 2002/0175265 A1* | 11/2002 | Bak et al. | 249/79 |
| 2004/0247725 A1* | 12/2004 | Lang et al. | 425/183 |
| 2007/0029698 A1* | 2/2007 | Rynerson et al. | 264/219 |

* cited by examiner

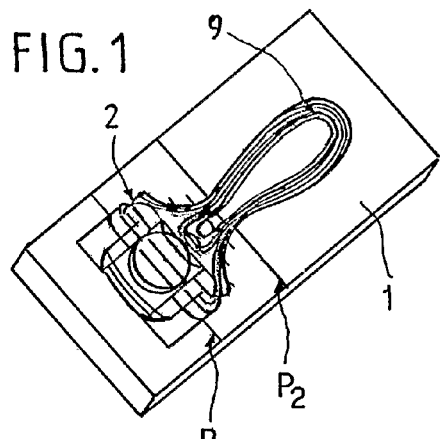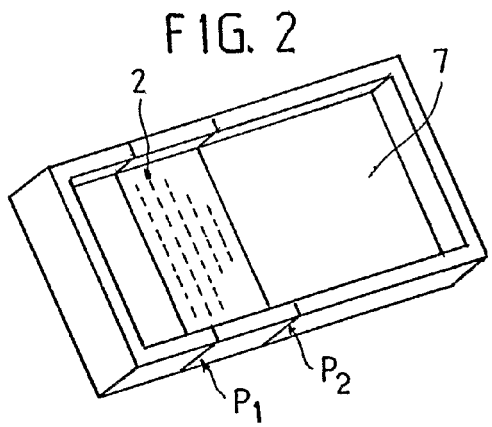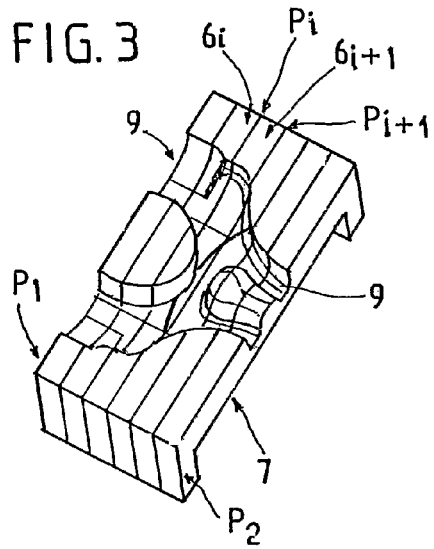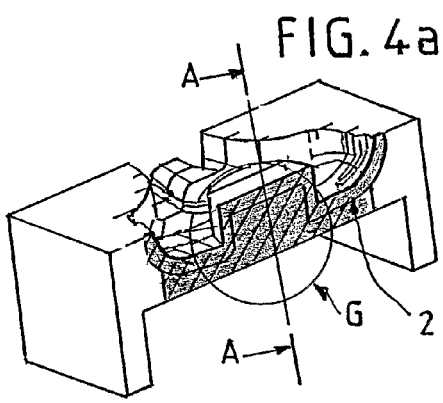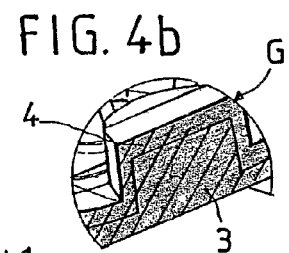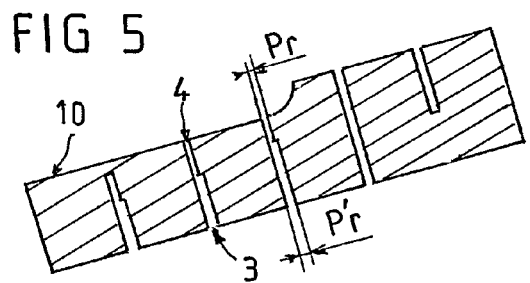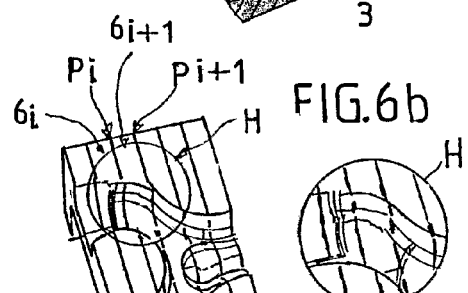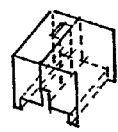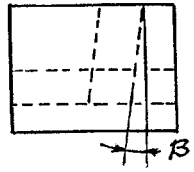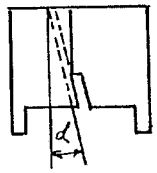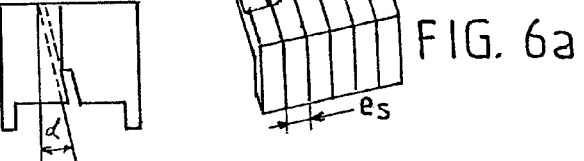

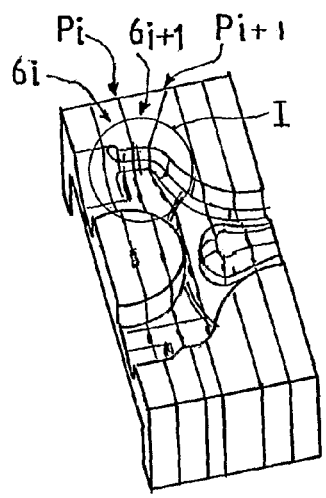
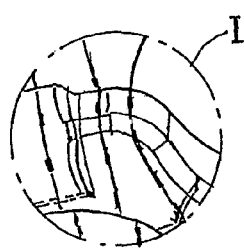
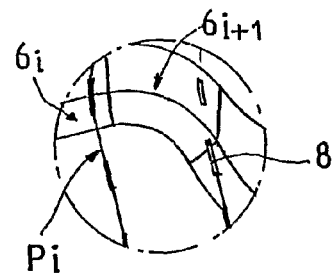
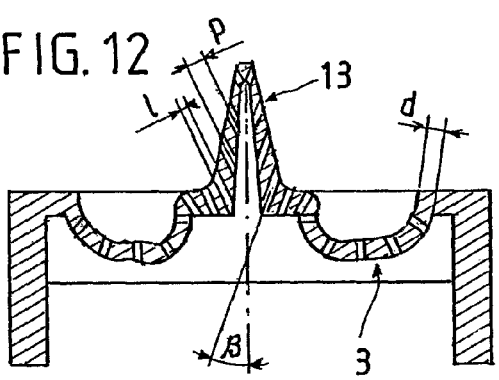
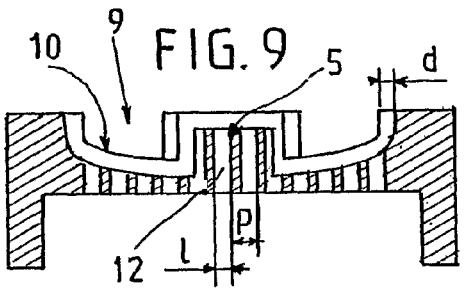
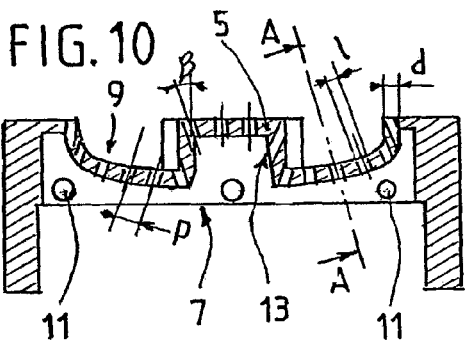
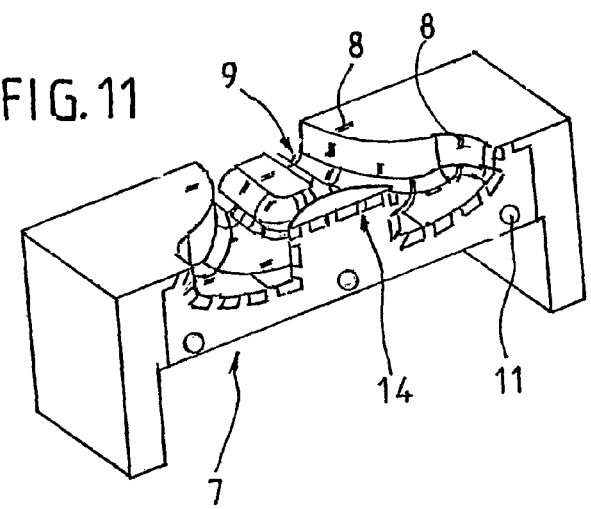
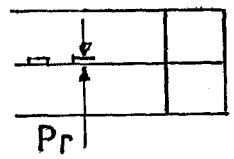
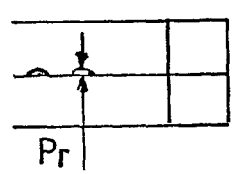
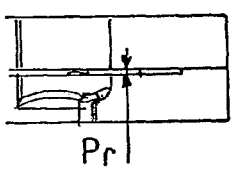

METHOD OF PRODUCING A PART BY DECOMPOSITION INTO LAYERS, SAID PART HAVING FLUID TRANSFER CHANNELS EXTENDING THROUGH THE INTER-LAYERS THEREOF

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a process for manufacturing a part having a fluid circuit, and to a part obtained by the process.

2. Description of Related Art Including Information Disclosed Under 37 CFR 1.97 and 37 CFR 1.98.

More particularly, the invention aims to solve the problems encountered when producing a channel for transferring fluids (liquid or gas) through the wall of a part, that is to say for transferring fluid from the inner cavity of the part to its outer surface (and vice versa). This invention is preferentially applicable in molds intended for the field of plastics processing (polystyrene injection molding, thermoforming), the foundry-work field (sandcasting), the mechanical field (tooling manufacture), the hydraulics field (manufacture of filters), and the glass-making field, this list not being exhaustive.

BRIEF SUMMARY OF THE INVENTION

In particular, the object of the invention is to replace and/or improve, in tooling, the use of holed filters or of drilled microholes on the surface of the tooling, these microholes serving usually:
vents for facilitating assisted or unassisted extraction of fluids;
fluid diffusers necessary for the manufacturing process in question.

The problems of the prior art are solved thanks to the invention, which consists in using the Stratoconception™ method in order to apply it to the manufacture of a part and of its integrated fluid circuit.

The Stratoconception™ method is described in the following patents and patent applications: FR 2 673 302, WO 00/31599 and WO 00/31600.

The subject of the present application is a novel application that solves abovementioned problems of the processes of the prior art.

BRIEF DESCRIPTION OF THE SEVERAL VIEWS OF THE DRAWINGS

The invention will be more clearly understood with the aid of the description below, given with reference to the following appended figures.

FIG. 1 is a top perspective view of a portion of tooling, seen from the impression side for molding a part to be produced, according to a first non-limiting exemplary embodiment of the invention.

FIG. 2 is another perspective view of the tooling portion of FIG. 1, seen from the rear side.

FIG. 3 is a perspective view of a part of the tooling portion of FIG. 1, which is bounded, for explanation purposes, by two planes (P1, P2) perpendicular to the opening plane of the mold and to the stratification direction.

FIGS. 4a and 4b are part perspective and sectional views for defining the composition of the fluid transfer channels and view of G in detail.

FIG. 5 is across-sectional view of the tooling of FIGS. 4a, 4b, produced in an inter-stratum plane (Pi) and showing a stratum ($6i$), seen along the arrows AA.

FIGS. 6a and 6b are perspective and isolated perspective views of the tooling according to the invention, produced with inter-stratum flat-surface planes, and of H in detail.

FIGS. 7a and 7b are perspective and isolated perspective views of the tooling according to the invention produced with warped-surface inter-stratum planes, and of I in detail.

FIG. 8 is an isolated and exploded perspective view of an inter-stratum plane (Pi) showing the construction of the channels by joining the strata ($6_i$) and ($6_{i+1}$) together at an inter-stratum plane ($P_i$).

FIG. 9 is a sectional view of one of the fluid transfer channels produced in an inter-stratum plane ($P_i$) according to a first variant.

FIG. 10 is another sectional view of one of the fluid transfer channels produced in an inter-stratum plane (Pi) according to a second variant.

FIG. 11 a perspective view of the channels obtained in an inter-stratum plane $P_i$ according to a second embodiment.

FIG. 12 is a sectional view showing a third variant of fluid channels provided in inter-stratum planes $P_i$.

FIG. 13 is a detailed schematic view of tooling produced according to the invention and provided with a feed duct or diffusion duct of rectangular cross section.

FIG. 14 is a detailed schematic view of tooling produced according to the invention and provided with a feed duct or diffusion duct of circular cross section.

FIG. 15 is another detailed schematic view of tooling produced according to the invention and provided with a feed duct or diffusion duct of any cross section.

FIG. 16a, 16b, 16c are schematic views showing the position of the angle of inclination ($\alpha$) relative to the angle ($\beta$).

DETAILED DESCRIPTION OF THE INVENTION

The producing of fluid discharge or diffusion channels in a portion of tooling intended for a motor vehicle will be described, byway of a non-limiting example of the application of the invention, in conjunction with FIGS. 1 to 16.

Of course, the invention may applied to any part, other than tooling, which includes a fluid circulation channel.

The invention consists in using the Stratoconception™ method to produce, in the various inter-stratum planes (these may be flat or warped), channels (2) for allowing a fluid to pass through the tooling (1) and around an object when molding the latter (FIG. 1 and FIG. 2).

Said cooling is formed from a rear face (7) and from a front face constituting the plane of opening of the tooling and including a molding cavity (9) for molding an object (not shown). According to this process, the tooling (1) is, by its design, subdivided into strata ( ... $6_i$, $6_{i+1}$ ... ) which, after being joined together, form a tooling (1) (FIG. 3). At the time of designing the tooling, each inter-stratum is provided with a set of channels (2) (hatched zone in FIG. 4) around the molding cavity (9) (and emerging into the latter) passing through the tooling.

These channels are thus closed and emerge at one end in the molding cavity (9) and at the other end on the rear face (7) so as to allow a fluid to pass from one side of the tooling or part to the other.

This set of channels (2) is formed from a feed portion (3) and a diffusion portion (4) connecting, on one side, the molding cavity (9) and, on the other side, the rear face (7) of the tooling (FIG. 4). To manage the fluid flow, the feed portion (3) may have a depth (P'r) greater than or equal to the depth (Pr) of the diffusion portion (4) (FIG. 5).

The use of "warped-surface" stratification makes it possible to eliminate in-fill problems (FIG. 6) and/or to maintain a fluid flow that is always normal to the molding surface (FIG. 7).

The channels (2) of one and the same inter-stratum plane (whether flat or warped) ($P_i$), which are produced, entirely or partly, in one face of a stratum ($6_i$), are open towards said inter-stratum plane ($P_i$) whereas the face facing the next stratum ($6_{i+1}$) (whether flat or warped) may include the complementary shape of the channels (2) (FIG. 8).

In one and the same inter-stratum plane, the separation of the feed portion (3) from the diffusion portion (4) is calculated, by an offset of a value (d), from the profile (10) of the part (FIG. 9). Said profile is determined by calculating the intersection of the surface of the molding cavity (9) with the inter-stratum plane ($P_i$). This value (d) may follow a law of variation according to the fluid circulation requirements and allows the channel (2) to be varied according to the profile (10) of the part in each inter-stratum plane ($P_i$).

The inter-stratum plane is formed from channels (2) (hatched zone in FIG. 4) for fluid circulation and from bearing zones (5) between the strata ($6_i$) and ($6_{i+1}$), it not mattering whether these are located in the diffusion portion (FIG. 9) or in the feed portion (FIG. 10). In this case, secondary bearing zones (11) may be provided in the feed portion. These secondary bearing zones make it possible to ensure precision and rigidity of the stack of strata if the area of the feed portion is much larger than that of the diffusion portion (FIG. 10). In certain cases, the rigidity of the tool may even need to be improved by producing nested strata as defined in the Applicant's patent FR 2 834 803.

When the bearing zones (5) are located in the feed portion, the latter is then formed from feed ducts (12). This configuration defines a first variant (FIG. 9). The feed ducts (12) are mutually parallel and characterized by a width (w) and a pitch (p) between two successive feed ducts. The diffusion portion thus ensures the flow of the fluid over the entire profile (10) of the molding cavity (FIG. 9).

Likewise, in a second design variant, the diffusion portion is provided with bearing zones and is formed from "diffusion" ducts (13) (FIG. 10). The diffusion ducts (13) can therefore be wither mutually parallel, or normal to the surface of the cavity, or else inclined at an angle ($\beta$) to the flow direction of the fluid in the feed channel (FIG. 10) and characterized by a width (w) and pitch (p) between two successive diffusion ducts (13). The result obtained on the tooling after assembling the strata is a network of diffusers in the form of slots (8) distributed over the entire molding surface (11). Seen from the rear, the tooling has a wide slot in each inter-stratum plane formed by the recess of the feed portion.

A third design variant has also been proposed (FIG. 12). This relates to the production of channels in parts or portions of parts that are slender, their slenderness being such that the diffusion portion of thickness (d) is predominant. Thus, the feed portion takes the form of a simple duct in which no bearing zone (5) is integrated. These bearing zones are therefore necessarily integrated in the diffusion portion, which is then formed from diffusion ducts (13) which may be mutually parallel, normal to the molding surface, or else inclined at an angle ($\beta$) to the flow direction of the fluid in the feed channel. The use of an angle ($\beta$) is preferred as it allows the diffusion of the fluid to be optimized and homogenized.

The geometry of the channels (2) width (w) and pitch (p) between two successive ducts (12) or (13) and the constant or variable thickness (es) of the strata can be parameterized according to the flowrate of fluid which has to pass from one face of the tooling to the other. The pitch "p" is defined by as the center-to-center distance between two ducts (12) in the case of a system of parallel ducts (FIG. 9) and as the length of the segment of the profile (10) separating two normal ducts (13) or two ducts inclined at an angle ($\beta$) (FIG. 10, FIG. 12).

The geometry of the ducts ((12) or (13) or (14)) is defined by its depth (Pr) and its cross section (14) in a plane perpendicular to the inter-stratum plane, which may be straight (FIG. 13), of circular section (FIG. 14) or of any section (FIG. 15).

The angle ($\beta$) is parameterizable and calculated numerically, and this may vary over the entire length of the part so as to enable the pressure drops to be minimized (mainly for the third variant).

This angle ($\beta$) is defined in the plane of the stratum, but it may also be supplemented with a second angle ($\alpha$) defined in the thickness of said stratum (FIG. 16).

All these parameters make it possible, when designing the tooling, to optimize and homogenize the flow of fluid over the entire molding surface so as to ensure the best performance for the tooling so that it can produce parts of optimized quality and/or with a minimal cycle time. Software packages dedicated to the Stratoconception ™ method carry out, mathematically and numerically, the decomposition into strata, the creation of said fluid transfer channels and the optimization of their parameters by implementing a specific algorithm.

We claim:

1. A process for manufacturing a part, the process comprising:
    forming a mould having a plurality of inter-stratum planes, said plurality of inter-stratum planes of said mould defining a cavity therein, each of said plurality of inter-stratum planes having a channel thereon so as to open to said cavity, each of the channels having a wide slot and a diffusion portion, the diffusion portion being formed with a primary bearing zone and formed with a plurality of diffusion ducts, each of the channels opening at one end to said cavity and at another end to a rear face of the mould;
    decomposing said plurality of inter-stratum planes of said mould into a succcession of strata;
    assembling successively the strata to form said mould; and
    manufacturing the part by transferring a fluid through the channels into said cavity so as to flow from one side to another side of said cavity.

2. The process of claim 1, the channels of one inter-stratum plane on one face of the stratum open toward the inter-stratum plane, the one inter-stratum plane having a face facing another inter-stratum plane.

3. The process of claim 1, the wide slot and the diffusion ducts in the same inter-stratum plane being calculated by an offset value from a profile of said cavity, the profile being determined by calculating an intersection of a surface of said cavity with the same inter-stratum plane.

4. The process of claim 1, the wide slot of the channel having a secondary bearing zone.

5. The process of claim 1, further comprising:
parameterizing a geometry of the channel and a thickness of the inter-stratum plane according to a flow rate of the fluid through the channel.

6. The process of claim 1, the step of forming comprising:
forming said plurality of diffusion ducts so as to be either parallel to or normal to a surface of said cavity.

7. The process of claim 1, the step of forming comprising:
forming said plurality of diffusion ducts so as to be inclined at an angle to a direction of flow of the fluid in the channel.ssss

* * * * *